United States Patent
Weng

(10) Patent No.: US 8,558,467 B2
(45) Date of Patent: Oct. 15, 2013

(54) ADJUSTABLE LIGHTING SYSTEM FOR FLUORESCENT LAMP AND SENSING APPARATUS OF THE ADJUSTABLE LIGHTING SYSTEM

(75) Inventor: Lin-Song Weng, Chu-Pei (TW)

(73) Assignee: Lin-Song Weng, Jhupei, Hsin-Chu County (TW)

( * ) Notice: Subject to any disclaimer, the term of this patent is extended or adjusted under 35 U.S.C. 154(b) by 323 days.

(21) Appl. No.: 12/940,450

(22) Filed: Nov. 5, 2010

(65) Prior Publication Data

US 2012/0086360 A1    Apr. 12, 2012

(30) Foreign Application Priority Data

Oct. 8, 2010   (TW) ................................ 99134494 A

(51) Int. Cl.
  *H05B 37/02* (2006.01)
  *H05B 39/04* (2006.01)
  *H05B 41/36* (2006.01)

(52) U.S. Cl.
  USPC ......................................... 315/156; 315/307

(58) Field of Classification Search
  None
  See application file for complete search history.

(56) References Cited

U.S. PATENT DOCUMENTS

| | | | | |
|---|---|---|---|---|
| 5,406,173 A | * | 4/1995 | Mix et al. | 315/156 |
| 5,455,487 A | * | 10/1995 | Mix et al. | 315/150 |
| 2003/0090219 A1 | * | 5/2003 | Kazanov et al. | 315/291 |
| 2006/0279521 A1 | * | 12/2006 | Lin | 345/102 |
| 2011/0080112 A1 | * | 4/2011 | Shearer et al. | 315/291 |

* cited by examiner

*Primary Examiner* — Douglas W Owens
*Assistant Examiner* — Dedei K Hammond
(74) *Attorney, Agent, or Firm* — Birch, Stewart, Kolasch & Birch, LLP

(57) ABSTRACT

An adjustable lighting system for fluorescent lamp includes a lighting unit, a sensing apparatus and a control apparatus. The lighting unit can emit a light. The sensing apparatus can sense if a target exists and generate a sensing signal accordingly. The sensing apparatus further generates and outputs a modulating signal based on the sensing signal. The control apparatus can receive the modulating signal from the sensing apparatus, adjust a supporting current of a power source and supply the pulse width and phase level of the current to the lighting unit, to control the intensity of the light emitted by the lighting unit.

13 Claims, 4 Drawing Sheets

ADJUSTABLE LIGHTING SYSTEM FOR FLUORESCENT LAMP AND SENSING APPARATUS OF THE ADJUSTABLE LIGHTING SYSTEM

FIELD OF THE INVENTION

The present invention relates to an adjustable lighting system and sensing apparatus for a fluorescent lamp, in particular, this invention relates to light emitting and light adjustment system and its sensing apparatus for fluorescent lamp with power saving function.

BACKGROUND OF THE INVENTION

Recently, due to the impact of global warming, the price rise of raw material and the issue of energy shortage, lots of environmental policies are implemented by many governments around the world, and the related manufacturers also invest on the development and manufacturing of power saving device.

For example, power saving lamp is one of the most popular power saving apparatus under development. In addition to the invention of power saving devices such as T5 fluorescent lamp and light emitting diode, there are also light emitting adjustment systems that achieve the power saving objective through the use of the changes of many kinds of adjustment ways. For example, the lighting number of lamp is controlled in section way through manual switch. However, it is very power-consuming during the point of lamp lighting, in the mean time, too frequent on and off of the lamp might lead to the damage of the bulb or the lamp tube, the switch button and the power circuit, etc.

Furthermore, the lighting equipment can be installed with infrared sensor for human body, then through the sensing of the existence of human activity in the neighborhood, the ON or OFF of the light lamp is then decided. Although such design has the advantage of high automation, yet when the human entrance and exit is frequent, there is still the issue of easy damage of bulb or lamp tube.

Furthermore, the lighting equipment can be installed with environment brightness sensor, then through the sensing of the level of environment brightness, the ON or OFF of the lighting lamp is decided. Although such design has the advantage of high automation, yet the lamp of such design is more suitable for general road or public site, for some internal sites that do not need high illumination of long time, for example, indoor parking lot or underground parking lot, it will consume lots of electricity and energy in the regular time if high illumination is given; however, if the brightness is too low when people is there, people might not be able to work due to low environmental brightness.

SUMMARY OF THE INVENTION

Therefore, in the present invention, adjustable lighting system for fluorescent lamp accompanied with human body infrared sensor is used to provide a method for energy saving and carbon reduction, that is, in the regular time when there is no people in the work site, the lamp will continuously reduce the light emitting brightness and use smaller watts for light emission. Moreover, when human and car passes through that site or when personnel enter that site to work, then after sensing and recognition is made in that system, light of maximal strength can be raised to illuminate the work site; such adjustable lighting system fluorescent lamp with light brightness management function, after accompanying with human body infrared sensor, can manage the light emitting brightness in the most effective way and achieve the maximal energy saving and carbon reduction function.

Therefore, one scope of the present invention is to provide adjustable lighting system for fluorescent lamp based on human body and environmental sensing so as to solve the prior art problem. According to one preferred embodiment, the adjustable lighting system for fluorescent lamp includes light emitting unit, sensing apparatus and control apparatus.

Among them, light emitting unit can emit light. Sensing apparatus can sense the existence of the target object so as to generate first sensing signal, meanwhile, based on first sensing signal, modulation signal is generated and sent out through wired or radio frequency way. In addition, control apparatus is connected respectively to the light emitting unit, sensing apparatus and power so as to receive modulation signal through wired or radio frequency wireless way from sensing apparatus; meanwhile, based on the modulation signal, the pulse width and phase level of the supplied current of the power is adjusted, and the supplied current is provided to light emitting unit so as to control the intensity of light emitted by the light emitting unit.

Particularly, when the target object exists, the modulation signal generated according to a first sensing signal can be sent back to the control apparatus of adjustable lighting system through the transmission line, or sent back to the control apparatus through the wireless transmission line, hence, the control apparatus can raise the pulse width and phase level of the supplied current so as to further raise the intensity of the light emitted by the light emitting unit. On the contrary, when the target object does not exist, the generated modulation signal will be sent back to the control apparatus so that the control apparatus can reduce the pulse width and phase level of the supplied current, accordingly, the light intensity emitted by the light emitting unit can be reduced. Furthermore, when the time is longer, the system can automatically further reduce the pulse width and phase level of the supplied current so as to further reduce light intensity and to achieve the objective of energy saving and carbon reduction.

Yet another scope of the present invention is to provide a sensing apparatus of adjustable lighting system for fluorescent lamp. According to an embodiment, the adjustable lighting system of the fluorescent lamp includes light emitting unit and control apparatus, and sensing apparatus includes a first sensing unit, processing unit and output unit.

The first sensing unit can sense the existence of target object in the neighborhood so as to generate a first sensing signal. The processing unit is connected to a first sensing unit to receive signal and to generate modulation signal according to the first sensing signal. In addition, the output unit is connected to a processing unit so as to receive the modulation signal sent from the processing unit and to convert it into modulation signal of the wired circuit or the wireless remote control, then the modulation signal is sent to the control apparatus of an adjustable lighting system of the fluorescent lamp through wired or radio frequency way, and control apparatus can follow the modulation signal to adjust the pulse width and phase level of the supplied current of the driving circuit, meanwhile, pulse widths and phase levels of different supplied currents are provided to light emitting unit so as to control the light intensity emitted.

Particularly, when the target object exists, the modulation signal generated according to a first sensing signal can let the control apparatus raise the pulse width and phase level of the supplied current so as to raise light intensity emitted by the light emitting unit. On the contrary, when the target object does not exist, then based on the generated modulation signal, the control apparatus will reduce the pulse width and the phase level of the supplied current so as to further reduce light intensity emitted by the light emitting unit.

For the advantages and spirit regarding the present invention, further understanding can be achieved through the following detailed description and attached drawings of the present invention.

DETAILED DESCRIPTION OF THE INVENTION

The present invention provides an adjustable lighting system for the fluorescent lamp and its sensing apparatus. In the followings, we are going to describe preferred embodiments and practical application cases of the present invention so as to fully describe the features, spirit and advantages of the present invention.

Figure 1A:
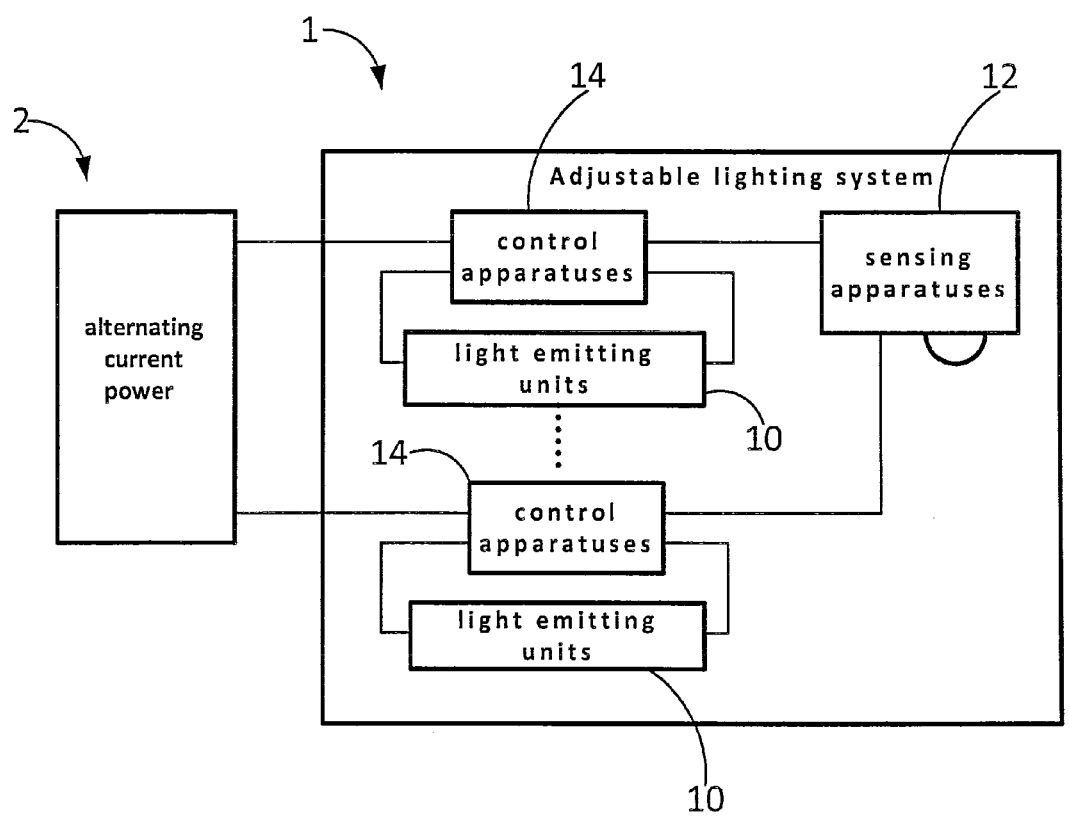
FIG. 1A illustrates adjustable lighting system of fluorescent lamp based on one embodiment of this invention.
Figure 1B:
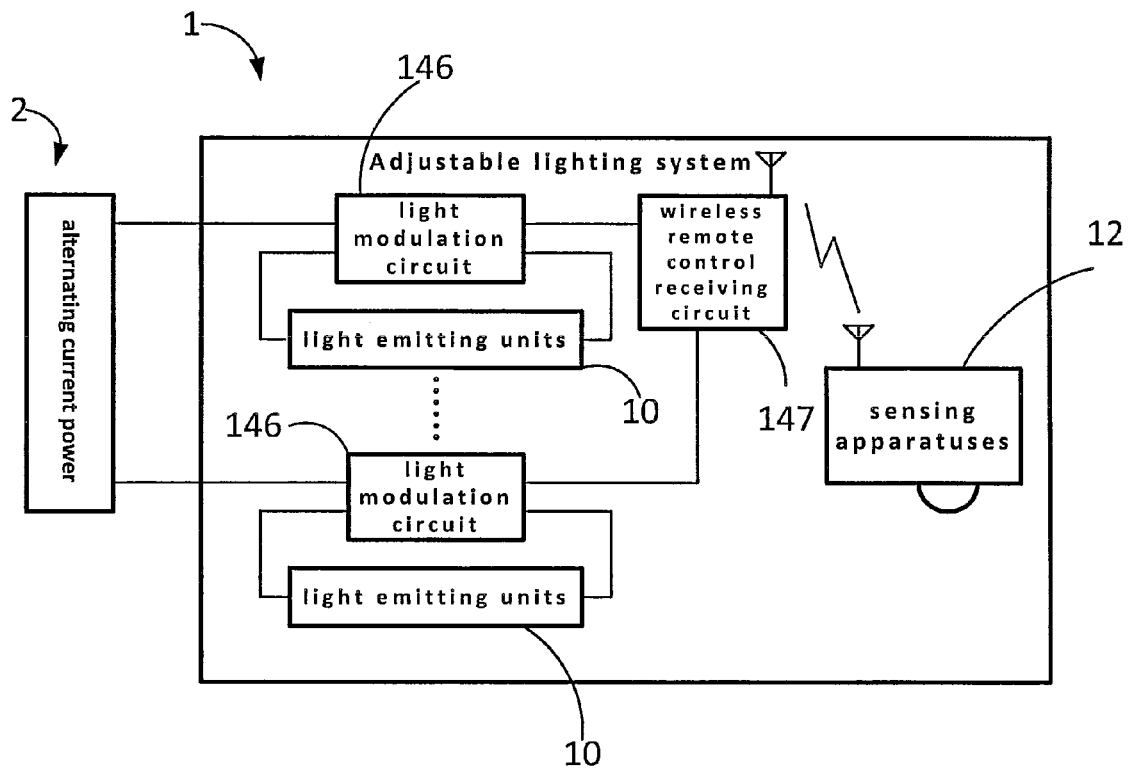
FIG. 1B illustrates adjustable lighting system of fluorescent lamp based on another embodiment of this invention.
Figure 1C:
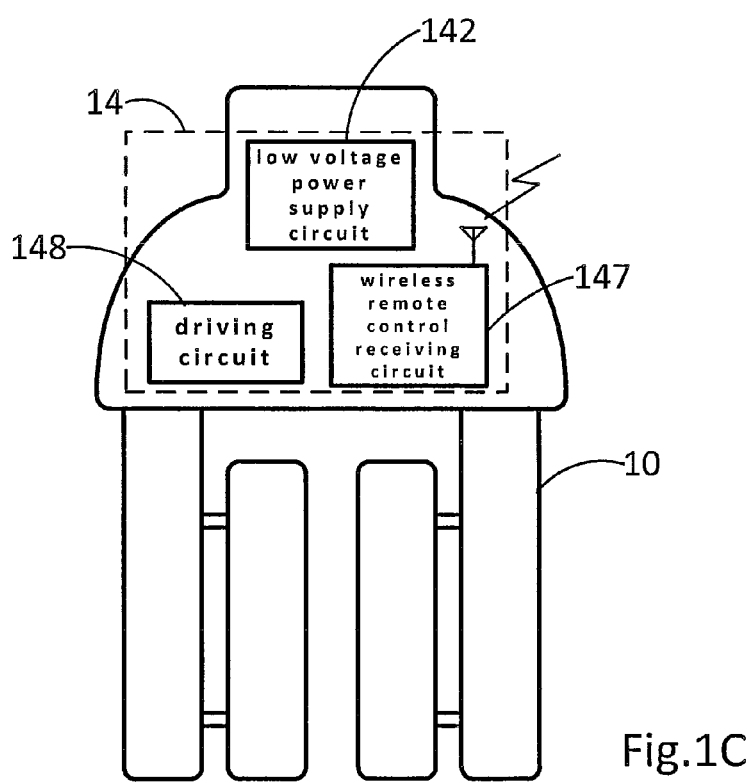
FIG. 1C illustrates light emitting unit and control apparatus of adjustable lighting system of fluorescent lamp based on one embodiment of this invention.
Figure 2:
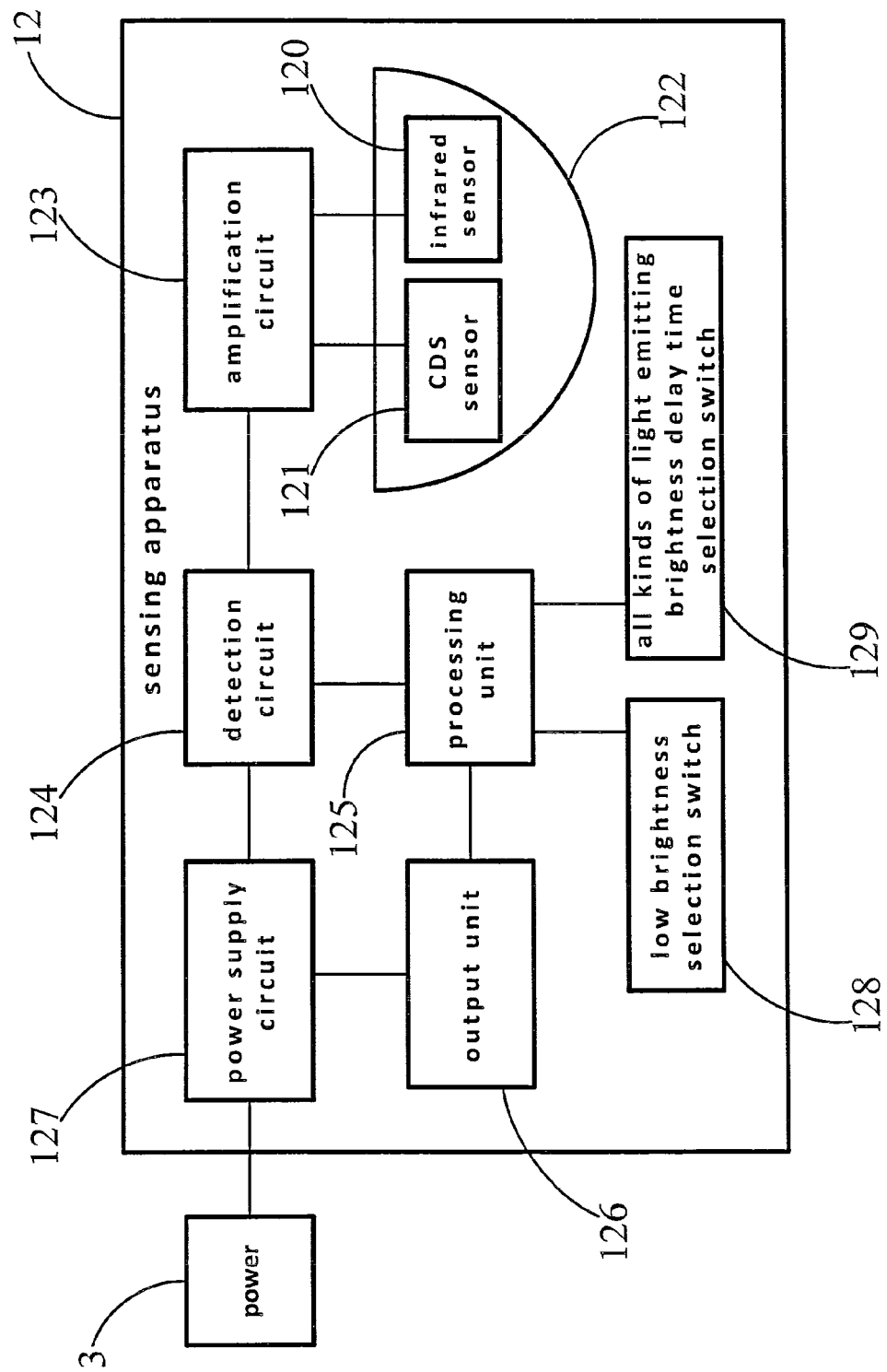
FIG. 2 illustrates sensing apparatus of adjustable lighting system of fluorescent lamp based on one embodiment of this invention.

Please refer to FIG. 1A to FIG. 3. In FIG. 1A, an illustration of adjustable lighting system for fluorescent lamp of an embodiment based on the present invention is drawn; FIG. 1B is an illustration of adjustable lighting system for fluorescent lamp of an embodiment based on the present invention; FIG. 1C is an illustration of the light emitting unit and the control apparatus of the adjustable lighting system of the fluorescent lamp of an embodiment based on the present invention; FIG. 2 is an illustration of sensing apparatus of adjustable lighting system of fluorescent lamp of an embodiment of the present invention; figure is an illustration of control apparatus of adjustable lighting system of fluorescent lamp of an embodiment based on the present invention.

As shown in FIG. 1A, adjustable lighting system 1 of fluorescent lamp of this invention can contain a light emitting unit 10, sensing apparatus 12 and control apparatus 14.

The light emitting unit 10, for example but not limited to, fluorescent lamp tube, bulb, fluorescent lamp, power saving lamp/bulb, light emitting diode, etc., can emit light. The sensing apparatus 12 can sense the existence of target object (For example, but not limited to, human, animal and vehicle, etc) so as to generate a first sensing signal, meanwhile, modulation signal is generated and sent out according to a first sensing signal. Furthermore, the control apparatus 14 is connected respectively to the light emitting unit 10, sensing apparatus 12 and alternating current power 2 so as to receive modulation signal from sensing apparatus 12; meanwhile, based on the modulation signal, the supplied voltage and current of alternating current power 2 is adjusted, furthermore, different pulse width and phase level of supplied current is provided to light emitting unit 10 so as to control the light intensity emitted by light emitting unit 10.

Particularly, when the target object exists, the modulation signal generated based on a first sensing signal can let control apparatus 14 raise the pulse width and phase level of the supplied current so as to further raise the intensity of light emitted by light emitting unit 10. On the contrary, when target object does not exist, then the modulation signal generated based on a first sensing signal can let control apparatus 14 reduce the pulse width and phase level of the supplied current, and the intensity of light emitted by light emitting unit 10 is further reduced.

As shown in the figure, in this embodiment, one sensing apparatus 12 can be connected to a plurality set of control apparatuses 14 and light emitting units 10. In other words, in practical application, the result sensed by one sensing apparatus 12 can be used to control the light intensities of several light emitting units 10. For example, sensing apparatus 12 can be set up at the center of a room installed with many sets of control apparatus 14 and light emitting unit 10, hence, when someone enters the room, sensing apparatus 12 can sense human activity to generate corresponding sensing signal so as to drive each control apparatus 14 to control the light emission of light emitting unit 10, and accordingly, the intensity of the emitted light is increased. When there is no human activity in the room, sensing apparatus 12 will generate corresponding sensing signal so as to drive each control apparatus 14 to reduce the light intensity emitted by the light emitting unit 10.

In practical application, the adjustable lighting system 1 of fluorescent lamp of this invention can also contain a plurality of sensing apparatuses 12 and one set or several sets of control apparatuses 14 and light emitting units 10. For example, several sensing apparatuses 12 can be placed respectively at several entrances of the parking lots, hence, when someone enters the parking lot through any entrance, corresponding sensing apparatus 12 installed at that entrance will then generate according sensing signal so as to drive the connected one or several control apparatuses 14 to control the light emission of light emitting unit 10 and to increase the intensity of the light emitted.

In addition, as shown in FIG. 1B, the above mentioned control apparatus can further include light modulation circuit 146 and wireless remote control receiving circuit 147; moreover, sensing apparatus 12 can, through radio frequency wireless way, send the modulation signal, through wireless remote control receiving circuit 147, to the light modulation circuit 146 to achieve the objective of the above mentioned adjustment of the light intensity emitted by light emitting unit 10 based on the sensing result of sensing apparatus 12.

Furthermore, as shown in FIG. 1C, light emitting unit 10 of the current invention can be, together with part of control apparatus 14 (the low voltage power supply circuit, 142, wireless remote control receiving circuit 147 and the driving circuit 148 as shown in the figure) or full of it, integrated into power saving lamp or other types of light emitting devices.

As shown in FIG. 2, sensing apparatus 12 of this embodiment can include infrared sensor (passive infra-red, PIR) 120, CDS sensor 121, lens 122, amplification circuit 123, detection circuit 124, processing unit 125, output unit 126, power supply circuit 127, low brightness selection switch 128 and all kinds of light emitting brightness delay time selection switch 129.

Infrared sensor 120 can sense whether the above mentioned or other target object exists in the neighborhood so as to generate first sensing signal. In the real application, other appropriate sensor can be used to replace the infrared sensor 120 as mentioned in this article. CDS sensor 121 can sense the environmental brightness in the neighborhood so as to generate the second sensing signal. Lens 122 can help the focusing of infrared sensor 120.

Amplification circuit 123 is connected respectively to infrared sensor 120 and CDS sensor 121 to amplify the first sensing signal generated by infrared sensor 120 and the second sensing signal generated by CDS sensor 121. Detection circuit 124 is connected to amplification circuit 123 to detect the potential of first sensing signal and second sensing signal. Processing unit 125 is connected to detection circuit 124, for example, SoC (System-on-Chip) processor or other suitable processing unit, to receive and to generate modulation signal according to first sensing signal and second sensing signal. Output unit 126 is connected to processing unit 125 to receive and output modulation signal, in actual application, the output unit 126 can be digital output driving circuit, which is connected, directly with cable or other connection wire, to control apparatus, or, output unit 126 can also be RF output driving circuit or other type of wireless output circuit, which controls control apparatus through wireless remote control signal (that is, control apparatus uses remote way to control receiving circuit 147 to receive modulation signal), then it will be forced to receive command to control light emitting unit to emit light of different intensities.

In practice, when the environmental brightness is lower than the first default value, the modulation signal generated according to second sensing signal can let control apparatus 14 raise the pulse width and phase level of the supplied current, which in turn raises the light intensity; on the contrary, when the environmental brightness is higher than the second default value, modulation signal generated according to second sensing signal can let control apparatus 14 lower the pulse width and phase level of the supplied current, which in turn lowers the intensity of the emitted light. In practice, the above mentioned first default value can be equal to or smaller than second default value.

Please note that in real application, we can give different weights to first sensing signal and second sensing signal sensed by sensing apparatus 12 so as to generate and output appropriate modulation signal. For example, we can let the weighting of first sensing signal be larger than second sensing signal, hence, no matter what the environmental brightness is (For example, no matter it is day time, evening or the night), as long as target object is sensed, sensing apparatus 12 will generate modulation signal so that control apparatus 14 can raise the pulse width and phase level of the supplied current, which in turn will raise the intensity of the light emitted to the default brightness (For example, have it raised to the full brightness of light emitting unit 10). Or, as long as target object is not sensed, sensing apparatus will generate modulation signal so that control apparatus 14 can reduce the pulse width and phase level of supplied current, which in turn will reduce the intensity of light emitted to the default value (For example, with a reduction to ½ brightness of light emitting unit 10).

In addition, we can let the weighting of second sensing signal be larger than first sensing signal, hence, no matter target object is sensed or not, as long as the environmental brightness is lower than the default value, sensing apparatus 12 will then generate modulation signal so that control apparatus 14 will raise pulse width and phase level of the supplied current, which in turn will raise the intensity of light emitted to default value (For example, the raise of it to the full brightness of light emitting unit 10). Or, as long as the environmental brightness is higher than the default value, sensing apparatus 12 will then generate modulation signal so that control apparatus 14 will lower the pulse width and phase level of the supplied current, which in turn will reduce the light intensity to the default brightness (For example, lower to ⅓ brightness of light emitting unit 10, or let light emitting unit 10 not to emit light).

Of course, in practice, sensing apparatus 12 can simultaneously follow first sensing signal and second sensing signal to generate and output modulation signal. For example, sensing apparatus 12 can, according to second sensing signal first (based on environmental brightness) to limit the modulation signal scope, then first sensing signal is based (based on the existence of target object) to select specific modulation signal; which is true on the contrary.

In addition, low brightness selection switch 128 and all kinds of light brightness delay time selection switches 129 are connected respectively to processing unit 125 to perform corresponding modulation. For example, low brightness selection switch 128 can control processing unit 125 so that when it receives first sensing signal representing that the infrared sensor 120 does not sense the existence of target object, and/or second sensing signal representing that the CDS sensor 121 senses an environmental brightness higher than second default value, it will then generate modulation signal representing low brightness or no brightness. Take another example, all kinds of brightness delay time selection switches 129 can control processing unit 125 to add high brightness light emission delay time (For example, but not limited to, light emission in high brightness for 10 seconds, 1 minute, 10 minutes and one hour) information to the modulation signal.

In real application, sensing apparatus 12 can also include correspondence table (not drawn) to store a plurality of sensing signals regarding to first sensing signal and/or second sensing signal and a plurality of modulation signal values corresponding respectively to a plurality of sensing signal values so that processing unit 125 can follow first sensing signal and/or second sensing signal to search the correspondence table so as to find out corresponding modulation signal value, then, based on it, it will generate and output modulation signal corresponding to modulation signal value. Therefore, sensing apparatus 12 of this invention can, based on the existence statuses of all kinds of different target object and/or environmental light source situation, generate corresponding modulation signal so as to more delicately control light intensity emitted by light emitting unit 10.

In addition, power supply circuit 127 is connected to each unit/circuit of the above mentioned sensing apparatus 12 so as to supply power needed by sensing apparatus 12. Power supply circuit 127 can, depending on the situation, be connected to alternating current (For example, mains electricity), and include alternating current/direct current converting circuit, filtering circuit, stabilizing circuit, step-down circuit, or other suitable circuit. Power supply circuit 127 can also be connected directly to DC current (For example, 12V DC current) to save the above mentioned complicated circuit.

Figure 3:
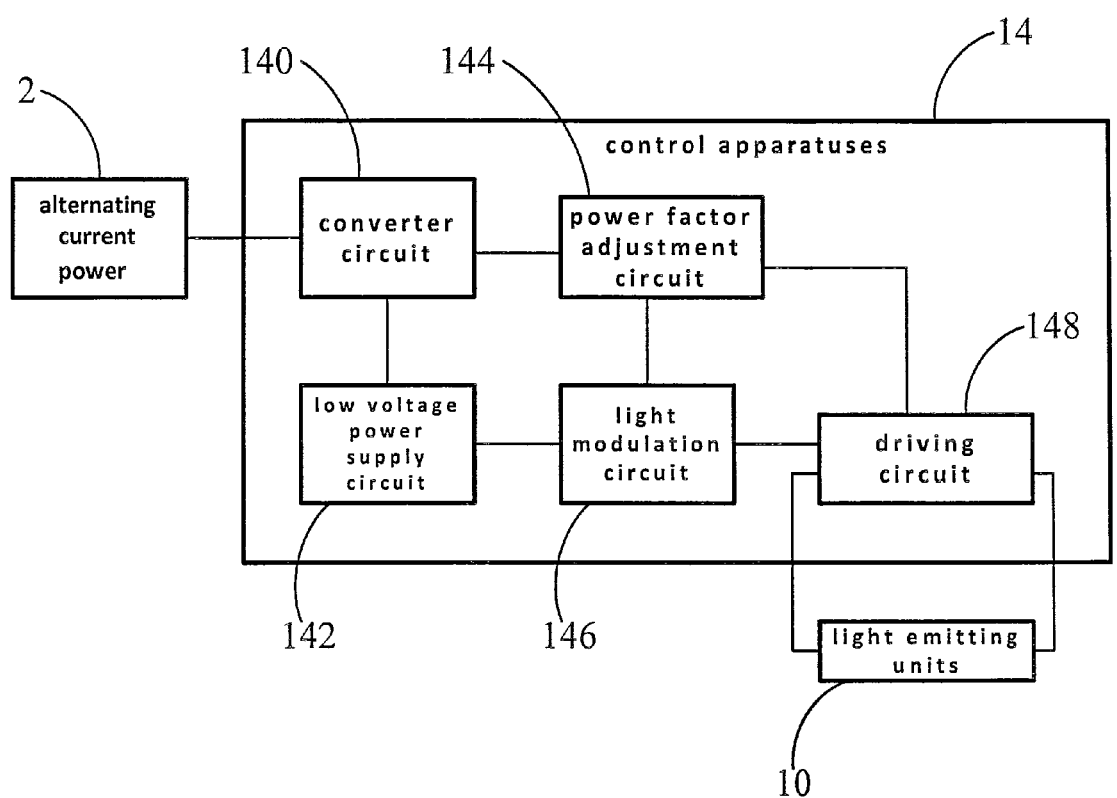
FIG. 3 illustrates control apparatus of adjustable lighting system of fluorescent lamp based on one embodiment of this invention.

As shown in FIG. 3, control apparatus 14 of this embodiment can include converter circuit 140, low voltage power supply circuit 142, power factor adjustment circuit 144, light adjustment circuit 146 and driving circuit 148.

Converter circuit 140 is generally connected to AC current (For example, main electricity), and include AC/DC converter circuit, filtering circuit, stabilizing circuit or other suitable circuit. Low voltage power supply circuit 142 is connected to converter circuit 140 so as to lower the voltage of the DC current converted from converter circuit 140 into low voltage DC power. Power factor adjustment circuit 144 is coupled to converter circuit 140 so as to adjust the power of the alternating current mains electricity generated during the conversion of converter circuit 140.

Light adjustment circuit 146 is coupled respectively to low voltage power supply circuit 142, power factor adjustment circuit 144 and sensing apparatus 12 so as to receive modulation signal and follow modulation signal to control power factor adjustment circuit 144. Please note that in practical application when sensing apparatus uses wireless way to transmit modulation signal, control apparatus 14 can further include the above mentioned wireless remote control receiving circuit 147 so that modulation circuit 146 can, through wireless remote control receiving circuit 147, receive modulation signal. Driving circuit 148 is connected respectively to power factor adjustment circuit 144, light adjustment circuit 146 and light emitting unit 10 so as to receive adjusted voltage and current from power factor adjustment circuit 144 and supply it to driving circuit 148 to control light intensity as expected and emitted by light emitting unit 10.

Please note that in real application, the adjustable lighting system of fluorescent lamp of this invention and its contained each main unit/device (That is, light emitting unit, sensing apparatus and control apparatus) or secondary unit/device can include other suitable unit and device, etc.; meanwhile, its quantity, size, deployment way and connection relationship can, without deviating from the spirit and scope of this invention, be adjusted according to real situation, and of course, it is not limited to the description of this invention. For example, each unit and device can, depending on the real situation, be combined into single hardware or be separated into several parts.

In addition, in real application, take the above mentioned parking lot as an example, adjustable lighting system of fluorescent lamp uses 28 W T5 fluorescent lamp of prior art, hence, when the sensing apparatus of adjustable lighting system of fluorescent lamp of this invention detects when there is human activity in the neighborhood of the detection area, adjustable lighting system of fluorescent lamp will light up in full wattage. But when in the night, there is no people entering the parking lot, adjustable lighting system of fluorescent lamp will then light up in half wattage, or in ⅔ of wattage, or other more suitable wattage to light up fluorescent lamp in that area so as to achieve the objective of energy saving and carbon reduction.

To sum up, the adjustable lighting system and its sensing apparatus of fluorescent lamp of this invention can, based on the existence of target object and/or environmental brightness, adjust the intensity of light emitted by light emitting unit. Particularly, when target object does not exist, adjustable lighting system and its sensing apparatus of fluorescent lamp of this invention can still control light emitting unit to emit light of specific lower intensity (For example, but not limited to light emitting unit ½, ⅓ and ¼ brightness of light emitting unit) so that a lower brightness illumination can be provided. Therefore, adjustable lighting system of fluorescent lamp of this invention can be applied to sites that need continuous illumination, for example, parking lot, basement, campus corner, landscape, stairway walkway and escape exit, that is, safety and energy saving function can be achieved simultaneously.

Although the present invention is disclosed through a better embodiment as above, yet it is not used to limit the present invention, anyone that is familiar with this art, without deviating the spirit and scope of the present invention, can make any kinds of change, revision and finishing; therefore, the protection scope of the present invention should be based on the scope as defined by the following attached "what is claimed".

What is claimed is:

1. An adjustable lighting system for fluorescent lamp, comprising:
    a light emitting unit, which is used to emit a light beam;
    a sensing apparatus, which is used to sense existence of a target object so as to generate a first sensing signal and sense an environmental brightness so as to generate a second sensing signal, and to generate a modulation signal based on the first sensing signal and the second sensing signal, wherein the sensing apparatus determines a range of the modulation signal based on the second sensing signal, and selects a specific modulation signal within the range based on the first sensing signal as the modulation signal, and sends out the modulation signal through a wired or radio frequency wireless way; and
    a control apparatus, which is connected to the light emitting unit and the sensing apparatus so as to receive the modulation signal from the sensing apparatus through the wired or radio frequency wireless way, wherein the control apparatus, based on the modulation signal, adjusts a pulse width and a phase level of current in a driving circuit is that is provided to the light emitting unit to control a light intensity emitted by the light emitting unit.

2. The adjustable lighting system for fluorescent lamp of claim 1, wherein when the environmental brightness is lower than a first default value, the pulse width and phase level of the supplied current corresponding to the range of the modulation signal selected based on the second sensing signal are increased by the control apparatus, thereby increasing the light intensity emitted by the light emitting unit; wherein when the environmental brightness is higher than a second default value, the pulse width and the phase level of the supplied current corresponding to the range of the modulation signal selected based on the second sensing signal are reduced by the control apparatus, thereby reducing the light intensity emitted by the light emitting unit.

3. The adjustable lighting system for fluorescent lamp of claim 2, wherein the sensing apparatus further includes:
    a first sensing unit, which is used to generate the first sensing signal by sensing whether the target object exists in the neighborhood;
    a second sensing unit, which is used to generate the second sensing signal by sensing the environmental brightness in its neighborhood;
    a processing unit, which is connected respectively to the first sensing unit and the second sensing unit for reception, and generates the modulation signal, based on the first sensing signal and the second sensing signal; and
    an output unit, which is connected to the processing unit, is used to send out the modulation signal through the wired or radio frequency wireless way.

4. The adjustable lighting system for fluorescent lamp of claim 3, wherein the first sensing unit is an infrared sensor (passive infra-red, PIR).

5. The adjustable lighting system for fluorescent lamp of claim 3, wherein the second sensing unit is a CdS sensor.

6. The adjustable lighting system for fluorescent lamp of claim 3, wherein the sensing apparatus further includes a correspondence table, which is used to store a plurality of sensing signal values regarding the first sensing signal, and a plurality of modulation signal values corresponded respectively to the plurality of sensing signal values, and the modulation signal corresponding to the modulation signal value of the first sensing signal is generated and sent out.

7. The adjustable lighting system for fluorescent lamp of claim 1, wherein the control apparatus further includes:
    a filtering and converter circuit, which is coupled to a power source;

a low voltage power supply circuit, which is coupled to the filtering and converter circuit;

a power factor adjustment circuit, coupled to the filtering and converter circuit;

a light modulation circuit, which is coupled respectively to the low voltage power supply circuit and the power factor adjustment circuit, wherein the light modulation circuit is connected to the sensing apparatus through a connection wire, or is connected to the sensing apparatus through a wireless remote control receiving circuit;

wherein the driving circuit is coupled respectively to the power factor adjustment circuit, the light modulation circuit and the light emitting unit.

8. A sensing apparatus used in an adjustable lighting system of a fluorescent lamp, wherein the adjustable lighting system of the fluorescent lamp includes a light emitting unit and a control apparatus, the sensing apparatus comprising:

a first sensing unit, which is used to generate a first sensing signal by sensing whether a target object exists in a neighborhood;

a second sensing unit, which is used to generate a second sensing signal by sensing an environmental brightness in the neighborhood;

a processing unit, which is connected to the first sensing unit and the second sensing unit and generates a modulation signal based on the first sensing signal and the second sensing signal, wherein the processing unit determines a range of the modulation signal based on the second sensing signal, and selects a specific modulation signal within the range based on the first sensing signal as the modulation signal; and an output unit, which is connected to the processing unit for outputting the modulation signal to the control apparatus through a wired or radio frequency wireless way, so that the control apparatus, based on the modulation signal, adjusts a pulse width and a phase level of a supplied current of a supplied voltage outputted to the light emitting unit so as to control a light intensity emitted by the light emitting unit.

9. The sensing apparatus of claim 8, wherein the first sensing unit is an infrared sensor (passive infra-red, PIR).

10. The sensing apparatus of claim 8, wherein when the environmental brightness is lower than a first default value, the pulse width and phase level of the supplied current corresponding to the range of the modulation signal selected based on the second sensing signal are increased by the control apparatus, thereby increasing the light intensity emitted by the light emitting unit; wherein when the environmental brightness is higher than a second default value, the pulse width and the phase level of the supplied current corresponding to the range of the modulation signal selected based on the second sensing signal are reduced by the control apparatus, thereby reducing the light intensity emitted by the light emitting unit.

11. The sensing apparatus of claim 10, wherein the second sensing unit is a CdS sensor.

12. The sensing apparatus of claim 8, wherein the processing unit further includes a correspondence table, which is used to store a plurality of sensing signals regarding the first sensing signal, and a plurality of modulation signal values corresponding respectively to the plurality of sensing signal values, and the modulation signal corresponding to the modulation signal value of the first sensing signal is generated and sent out.

13. The sensing apparatus of claim 8, wherein the control apparatus is connected to the output unit through a connection wire or is connected to the output unit through a wireless remote control receiving circuit.

\* \* \* \* \*